US008957896B2

(12) United States Patent
Burley et al.

(10) Patent No.: US 8,957,896 B2
(45) Date of Patent: Feb. 17, 2015

(54) STREAMING HIERARCHY TRAVERSAL RENDERER

(75) Inventors: Brent Burley, Monterey Park, CA (US); Andrew Selle, Montrose, CA (US); Christian Eisenacher, Burbank, CA (US); Gregory Nichols, North Hollywood, CA (US)

(73) Assignee: Disney Enterprises, Inc., Burbank, CA (US)

( * ) Notice: Subject to any disclaimer, the term of this patent is extended or adjusted under 35 U.S.C. 154(b) by 277 days.

(21) Appl. No.: 13/493,902

(22) Filed: Jun. 11, 2012

(65) Prior Publication Data

US 2013/0328857 A1 Dec. 12, 2013

(51) Int. Cl.
*G06T 15/50* (2011.01)

(52) U.S. Cl.
USPC .......................................... 345/426; 345/418

(58) Field of Classification Search
None
See application file for complete search history.

(56) References Cited

U.S. PATENT DOCUMENTS

| | | | |
|---|---|---|---|
| 5,045,995 | A | 9/1991 | Levinthal |
| 5,923,330 | A * | 7/1999 | Tarlton et al. ................. 345/419 |
| 6,016,150 | A | 1/2000 | Lengyel |
| 6,300,965 | B1 | 10/2001 | Sowizral |
| 6,496,601 | B1 | 12/2002 | Migdal |
| 6,714,936 | B1 * | 3/2004 | Nevin, III ............................. 1/1 |
| 7,095,409 | B2 | 8/2006 | Cook |
| 7,129,940 | B2 | 10/2006 | Cook |
| 7,168,074 | B1 | 1/2007 | Srinivasa |
| 7,289,119 | B2 | 10/2007 | Heirich |
| 7,783,695 | B1 | 8/2010 | Tyrrell |
| 8,106,906 | B1 | 1/2012 | Duff |
| 8,174,524 | B1 | 5/2012 | Laur |
| 8,217,949 | B1 | 7/2012 | Carpenter |
| 8,400,447 | B1 * | 3/2013 | Carr et al. ..................... 345/419 |
| 8,411,082 | B1 | 4/2013 | Cook |
| 8,416,260 | B1 | 4/2013 | Carpenter |
| 8,436,856 | B1 | 5/2013 | Duff |
| 8,436,867 | B1 | 5/2013 | Duff |
| 8,466,919 | B1 | 6/2013 | Duff |
| 8,493,383 | B1 | 7/2013 | Cook |
| 2002/0050990 | A1 | 5/2002 | Sowizral |
| 2005/0146522 | A1 | 7/2005 | Maillot |

(Continued)

OTHER PUBLICATIONS

Crassin, C. et al.: "Interactive Indirect Illumination Using Voxel Cone Tracing", Pacific Graphics 2011, vol. 30, No. 7, 2011, 10 pages, Retrieved from the Internet: <URL:https://research.nvidia.com/sites/default/files/publications/GIVoxels-pg2011- authors.pdf>.

(Continued)

*Primary Examiner* — Said Broome
(74) *Attorney, Agent, or Firm* — Farjami & Farjami LLP

(57) ABSTRACT

A method is provided for a streaming hierarchy traversal renderer with particular application for feature films and other demanding content creation using scenes of high complexity that cannot fit in memory. The renderer organizes scene geometry into a spatial hierarchy, generates directional queries to be traced in the spatial hierarchy, performs a streaming hierarchy traversal over the directional queries, and uses the results of the directional queries to shade or render the scene. The traversal performs a single pass over the directional queries for splitting into one child stream of directional queries for each child node at each scene node in the hierarchy. A prioritized traversal of the hierarchy may also be carried out using various cost-metrics for optimized parallelism. The rendering may also bounce the directional queries to provide multi-pass global illumination.

20 Claims, 3 Drawing Sheets

(56) References Cited

U.S. PATENT DOCUMENTS

| | | |
|---|---|---|
| 2006/0209067 A1 | 9/2006 | Pellacini |
| 2007/0262988 A1 | 11/2007 | Christensen |
| 2008/0180440 A1* | 7/2008 | Stich ............................ 345/426 |
| 2009/0225081 A1 | 9/2009 | Keller |
| 2010/0231589 A1 | 9/2010 | Salsbury |
| 2012/0147015 A1 | 6/2012 | Rogers |
| 2013/0016107 A1 | 1/2013 | Dharmapurikar |
| 2014/0285499 A1 | 9/2014 | Iwasaki |

OTHER PUBLICATIONS

Arvo, J.: "Fast Ray Tracing by Ray Classification", ACM, 2 Penn Plaza, Suite 701—New York USA, vol. 21. No. 4, Jul. 1987 10 pages.
Amanatides, J.: "Ray tracing with cones" Computers and Graphics, Elsevier, GB, vol. 18, No. 3, Jul. 1, 1984, pp. 129-135, 7 pages.
Wald, I. et al: "Interactive Global Illumination using Fast Ray Tracing", ACM, 2 Penn Plaza, Suite 701—New York USA, 2002 11 pages.
Wikipedia: "Stencil Buffer", Apr. 3, 2012, Retrieved from the Internet: <URL:http://en.wikepedia.org/w/index.php?title=Stencil_buffer&oldid=485283047> 2 pages.
EESR dated Feb. 7, 2013 re Application No. 13160552.9.
Afra, A., "Incoherent Ray Tracing without Accelertion Structures", Eurographics 2012 Short Paper, 4 pages.
Aila et al. 2010. Architecture considerations for tracing incoherent rays. In *Proceedings of the Conference on High Performance Graphics*(HPG '10). Eurographics Association, Aire-la-Ville, Switzerland, Switzerland, 113-122.
Arvo et al., Fast ray tracing by ray classification, Proceedings of the 14th annual conference on Computer graphics and interactive techniques, p. 55-64, Aug. 1987 [doi>10.1145/37401.37409].
Benthin et al., Combining Single and Packet-Ray Tracing for Arbitrary Ray Distributions on the Intel MIC Architecture, IEEE Transactions on Visualization and Computer Graphics, v.18 n.9, p.1438-14, Sep. 2012.
Bikker, J., Improving Data Locality for Efficient In-Core Path Tracing, Computer Graphics Forum, v.31 n.6 p.1936-1947, Sep. 2012 [doi>10.111/j.1467-8659.2012.03073.x].
Boulos et al.: Adaptive ray packet reordering. In *Proc. of Interactive Ray Tracing*(2008).
Budge et al.: Out-of-core data management for path tracing on hybrid resources. In *Computer Graphics Forum*(2009).
Christensen et al., "Ray Tracing for the Movie 'Cars'", Interactive Ray Tracing 2006, IEEE Symposium, Sep. 18-20, 2006, pp. 1-6.
Crassin et al., (2011), Interactive Indirect Illumination Using Voxel Cone Tracing. Computer Graphics Forum, 30: 1921-1930. doi: 10.1111/j.1467-8659.2011.02063.x.
Dammertz et al., Shallow bounding volume hierarchies for fast SIMD ray tracing of incoherent rays, Proceedings of the Nineteenth Eurograpics conference on Rendering, June 23-25, 2008, Sarajevo, Bosnia and Herzegovina.
Ernst et al.: Multi bounding volume hierarchies. In Proc. of Interactive Ray Tracing (2008).
Garanzha et al.: Fast ray sorting and breadth-first packet traversal for GPU ray tracing. *Computer Graphics Forum*(2010).
Gribble et al.: Coherent ray tracing via stream filtering. In *Proc. of Interactive Ray Tracing*(2008).
Hanika et al., Two-level ray tracing with reordering for highly complex scenes, Proceedings of Graphics Interface 2010, May 31-Jun. 2, 2010, Ottawa, Ontario, Canada.
Hanrahan, P., Using caching and breadth-first search to speed up ray-tracing, Proceedings on Graphics Interface '86/Vision Interface '86, p.56-61, Aug. 1986, Vancouver, British Columbia, Canada.
Hoberock et al., Stream compaction for deferred shading, Proceedings of the Conference on High Performance Graphics 2009, Aug. 1-3, 2009, New Orleans, Louisiana [doi>10.11445/1572769.1572797].
Kato at al., "Parallel Rendering and the Quest for Realism: The 'Kilauea' Massively Parallel Ray Tracer", Practical Parallel Processing for Today's Rendering Challenges, SIGGRAPH 2001, Course Note #40, ACM, Aug. 2001, Los Angeles, USA, Aug. 12-17, 1 p.
Kato, T., "Kilauea": parallel global illumination renderer, Proceedings of the Fourth Eurographics Workshop on Parallel Graphics and Visualization, Sep. 9-10, 2002, Blaubeuren, Germany.
Keller et al., "Efficient Ray Tracing without Auxiliary Acceleration Data Structure", HPG 2011, 1 page.
Moon et al., Cache-oblivious ray reordering, ACM Transactions on Graphics (TOG), v.29 n.3, p. 1-10, Jun. 2010 [doi>10.1145/1805964.1805972].
Nakarmaru et al., Breadth-First Ray Tracing Utilizing Uniform Spatial Subdivision, IEEE Transactions on Visualization and Computer Graphics, v.3 n.4, p. 316-328, Oct. 1997 [doi>10.1109/2945.646235].
Navratil et al., Dynamic Ray Scheduling to Improve Ray Coherence and Bandwidth Utilization, Proceedings of the 2007 IEEE Symposium on Interactive Ray Tracing, p. 95-104, Sep. 10-12, 2007 [doi>10.
Overbeck et al.: Large ray packets for real-time Whitted ray tracing. In *Proc. of Interactive Ray Tracing*(2008).
Pantaleoni et al., PantaRay: fast ray-traced occlusion caching of massive scenes, ACM Transactions on Graphics (TOG), v.29 n.4, Jul. 2010 [doi>10.1145/1778765.1778774].
Pharr et al., Rendering complex scenes with memory-coherent ray tracing, Proceedings of the 24th annual conference on Computer Graphics and interactive techniques, p. 101-108, Aug. 1997 [doi>10.1145/258734.2587.
Ramani et al., 2009. StreamRay: a stream filtering architecture for coherent ray tracing, *SIGPLAN*Not. 44, 3 (Mar. 2009), 325-336. DOI×10.1145/1508284.1508282    http://doi.acm.org/10.1145/1508284.1508282.
Reinhard et al., Hybrid scheduling for parallel rendering using coherent ray tasks, Proceedings of the 1999 IEEE symposium on Parallel visualization and graphics, p.21-28, Oct. 25-26, 1999: San Francisco, California.
Reshetov et al., Multi-level ray tracing algorithm, ACM Transactions on Graphics (TOG), v.24 n.3, Jul. 2005 [doi>10.1145/1073204.1073329].
Tsakok, J., Faster incoherent rays: Multi-BVH ray stream tracing, Proceedings of the Conference on High Performance Graphics 2009, Aug. 1-3, 2009, New Orleans, Louisiana [doi>10.1145/1572769.1572793].
Wald et al. "SIMD Ray Stream Tracing-SIMD Ray Traversal with Generalized Ray Packets and On-the-fly Re-Ordering." *Informe Técnico, SCI Institute*(2007).
Wald et al., Interactive distributed ray tracing of highly complex models, Proceedings of the 12th Eurographics conference on Rendering, Jun. 1, 2001, London, UK [doi>10.2312/EGWR/EGWR01/277-288].
Wald et al.: Getting rid of packets: efficient SIMD single-ray traversal using multi-branching BVHs. In Proc. of Interactive Ray Tracing (2008).
U.S. Appl. No. 12/043,041, filed Mar. 5, 2008, Titled "Multithreading in Rendering", First Named Inventor: Fong.
U.S. Appl. No. 12/120,711, filed May 15, 2008, Titled "Lagrangian Filtering", First Named Inventor: Carpenter.
U.S. Appl. No. 12/533,965, filed Jul. 31, 2009, Titled "System and Methods for Implementing Object Oriented Structures in a Shading Language", First Named Inventor: Duff.
U.S. Appl. No. 13/280,258, filed Oct. 24, 2011, Titled "Programmable System for Artistic Volumetric Lighting", First Named Inventor: Nowrouzezahrai.

* cited by examiner

US 8,957,896 B2

STREAMING HIERARCHY TRAVERSAL RENDERER

BACKGROUND

Realistic lighting is an important component of high quality computer rendered graphics. By utilizing a renderer employing a global illumination model, scenes can be provided with convincing reflections, shadows and indirect illumination, providing the requisite visual detail demanded by feature length animated films and other content. Conventionally, a ray tracing renderer may be utilized to provide global illumination in a simple manner.

SUMMARY

The present disclosure is directed to a streaming hierarchy traversal renderer, substantially as shown in and/or described in connection with at least one of the figures, as set forth more completely in the claims.

DETAILED DESCRIPTION

Figure 1:
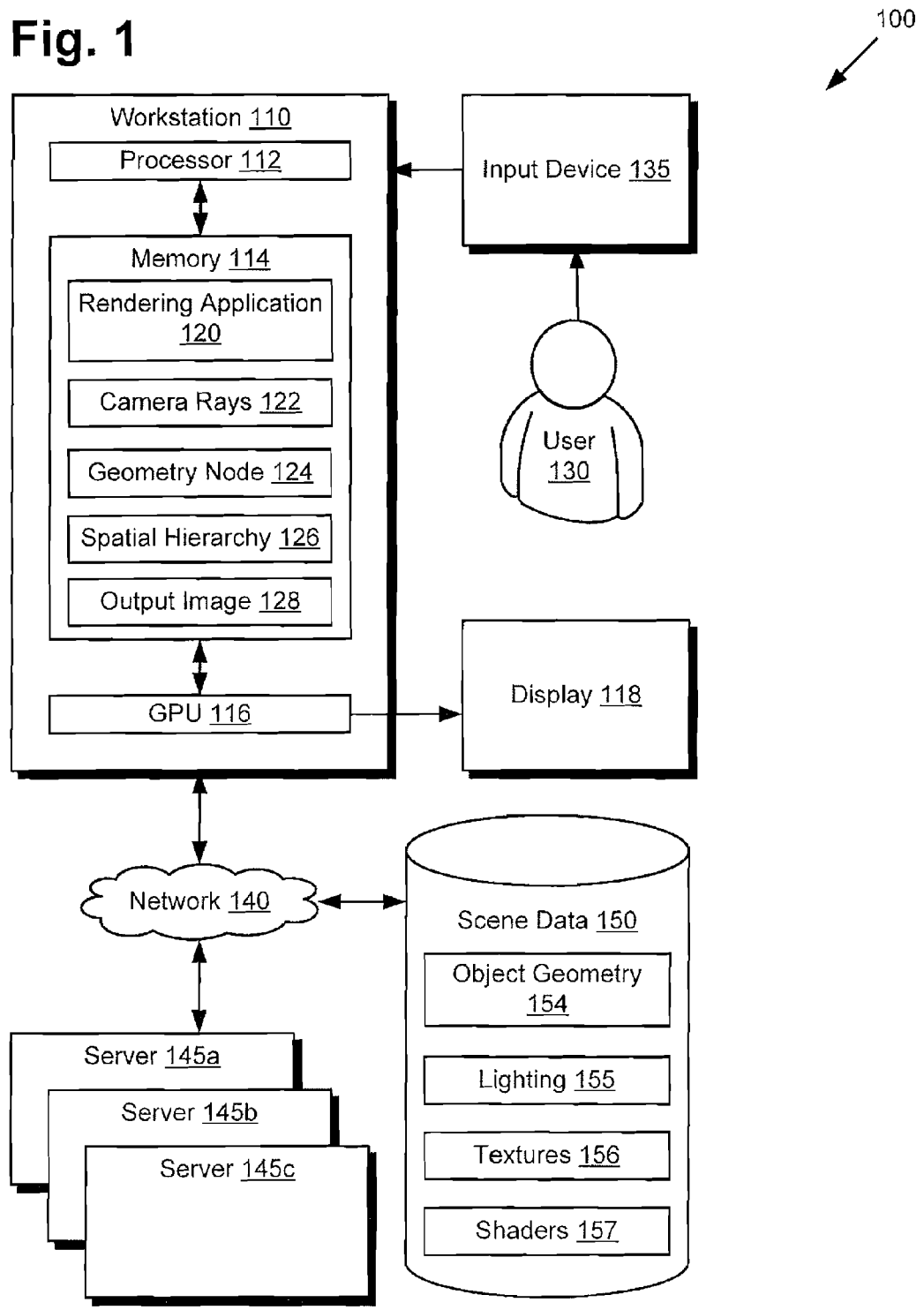
FIG. 1 presents an exemplary diagram of a system for providing a streaming hierarchy traversal renderer.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

With large processing overhead and highly random data access requirements, ray tracing is less suitable for complex scenes with larger amounts of data. Since memory requirements for efficient random access grow with scene complexity, the straightforward ray tracing renderer becomes impractical for rendering the highly detailed scenes demanded by feature films and other challenging applications.

Rasterizing renderers, on the other hand, provide high performance and are amenable to localized data access. Thus, rasterizing renderers can readily work with scene data divided into smaller coherent blocks, providing efficient rendering of large and complex scenes even with limited amounts of memory. However, only a lower quality approximation of global illumination can be provided with rasterizing renders, for example using environment maps or other techniques. While approximations can also be provided using point-based rendering, point-based rendering still has the drawbacks of requiring separate pre-processing passes and sacrificing direct light shadowing support.

Accordingly, FIG. 1 presents an exemplary diagram of a system for providing a streaming hierarchy traversal renderer. Diagram 100 of FIG. 1 includes workstation 110, display 118, user 130, input device 135, network 140, servers 145a, 145b and 145c, and scene data 150. Workstation 110 includes processor 112, memory 114, and graphics processing unit (GPU) 116. Memory 114 includes rendering application 120, camera rays 122, geometry node 124, spatial hierarchy 126, and output image 128. Scene data 150 includes object geometry 154, lighting 155, textures 156, and shaders 157.

Workstation 110 may comprise any computing device such as a rackmount server, desktop computer, or mobile computer. User 130 may utilize input device 135, for example a keyboard and mouse, to direct the operation of rendering application 120 executing in memory 114 of processor 112. Rendering application 120 may process scene data 150 received from network 140 to generate a rendered output image 128 for output to display 118 through GPU 116. Network 140 may be a high speed network suitable for high performance computing (HPC), for example a 10 GigE network or an InfiniBand network.

Once completed, output image 128 may also be copied to non-volatile storage, not shown in FIG. 1. For simplicity, it is assumed that output image 128 is only a single frame and that object geometry 154 already includes the positioning of all objects within the scene for the associated frame. However, in alternative embodiments, scene data 150 may further include motion data for object geometry 154, in which case several animation frames may be rendered by rendering application 120.

Moreover, some embodiments may render multiple frames of the same scene concurrently, for example to provide alternative camera angles or to provide stereoscopic rendering. Lighting 155 may include the properties of all light sources within the scene, textures 156 may include all textures for object geometry 154, and shaders 157 may include any shaders to correctly shade object geometry 154. Other data may also be stored in scene data 150, for example virtual camera parameters and camera paths.

As previously discussed, it is desirable to provide realistic lighting for a computer generated graphics rendering, or output image 128. While rasterizing renderers can provide high performance, global illumination can only be approximated. For demanding applications such as feature film rendering, global illumination is desired from rendering application 120. However, such demanding applications may also have highly complicated scenes, with object geometry 154 of scene data 150 being at least an order of magnitude larger than memory 114. Artists may desire massive complexity with the use of highly detailed three-dimensional models and tesselation, procedural generation of objects and landscapes, and asset duplication and re-use, resulting in object geometry 154 having huge numbers of geometric primitives. Accordingly, using a straightforward ray tracing algorithm for rendering application 120 quickly grows impractical.

For example, assume rendering application 120 individually traces each of camera rays 122 as in a conventional ray tracing renderer. After each of camera rays 122 performs a first bounce on object geometry 154, data access of object geometry 154 quickly becomes incoherent due to the unpredictable manner in which the camera rays may travel. Such incoherent access patterns for object geometry 154 result in many cache misses as not enough memory 114 is available, causing heavy traffic across network 140 with the attendant latency penalties. If scene data 150 is relocated to a local disk of workstation 110, disk thrashing generates a similar latency penalty. Even assuming the ideal case where scene data 150 can fit entirely within memory 114, the incoherent access patterns for object geometry 154 results in many cache misses for the on-die cache of processor 112, resulting in latency from accesses to memory 114. Thus, the heavy latency penalties for conventional ray tracing renderers preclude practical usage in rendering large and complex scenes. Heavy latency is especially problematic as advancements for reducing latency are difficult to achieve and face fundamental physical limitations blocking further improvement.

On the other hand, present trends in computational performance indicate the doubling of bandwidth every two years, including processor speed, processor cache, memory capacity, disk capacity, network bandwidth, and so forth. Thus, the available on-die cache for processor 112, the size of memory 114, and the bandwidth for network 140 may substantially increase over time. On the other hand, latency penalties for cache misses remains fairly static, improving 20-30% at best during the same two year period. Moreover, bandwidth is unbounded by physical limitations, unlike latency. Thus, it would be advantageous if rendering application 120 can reduce processing factors that rely on latency in favor of those that rely on bandwidth.

Accordingly, a streaming hierarchy traversal renderer is proposed for rendering application 120. All the camera rays 122 for rendering output image 128 are generated and may be kept within memory 114. Camera rays 122 may sample radiance values as in a conventional ray-tracing algorithm. However, in other implementations, any kind of directional query may be utilized for camera rays 122. Thus, camera rays 122 may also sample visibility values, for example to skip occluded points during shading, and may also track any other scene attribute. Moreover, camera rays 122 do not necessarily need to be rays and can also be any desired tracing shape such as circular cones, elliptical cones, polygonal cones, and other shapes.

Object geometry 154 is streamed into memory 114 as individual work units or nodes, with an exemplary geometry node 124 as shown in FIG. 1. The streaming of object geometry 154 into geometry node 124 may be according to a traversal of spatial hierarchy 126. Geometry node 124 is processed against camera rays 122 using other elements of scene data 150 as needed, after which geometry node 124 may be freed from memory 114. Since all processing may be completed after freeing or deallocating the node from memory 114, each geometry node 124 of object geometry 154 may be accessed at most once, and may also be skipped if the geometry node is not visible in the current scene.

In one configuration, the above streaming of object geometry 154 is repeated for as many global illumination bounce passes as desired, for example 2-4 passes. Since performing only one pass is equivalent to ray casting, at least two passes may be done. Thus, by relying on memory 114 to provide sufficient memory space for all of camera rays 112 and the bandwidth of network 140 to efficiently stream the large amount of complex geometric data from object geometry 154, data coherency may be greatly improved by enabling streaming of object geometry 154 in naturally coherent nodes. As a result, complex caching schemes for geometry may be omitted, simplifying the implementation of rendering application 120.

Since each geometry node 124 is an individual work unit and can be processed without dependencies from other geometry nodes, servers 145a, 145b, and 145c may also be utilized for distributed parallel processing. Servers 145a, 145b, and 145c may contain components similar to those of workstation 110. SIMD (single instruction, multiple data) instructions on processor 112 and shaders on GPU 116 may be utilized to further enhance parallelism. Prioritized hierarchical traversal of camera rays 122 across spatial hierarchy 126 may also be utilized to reduce the number of intersection comparisons and increase parallelism, which is discussed further below.

Figure 2:
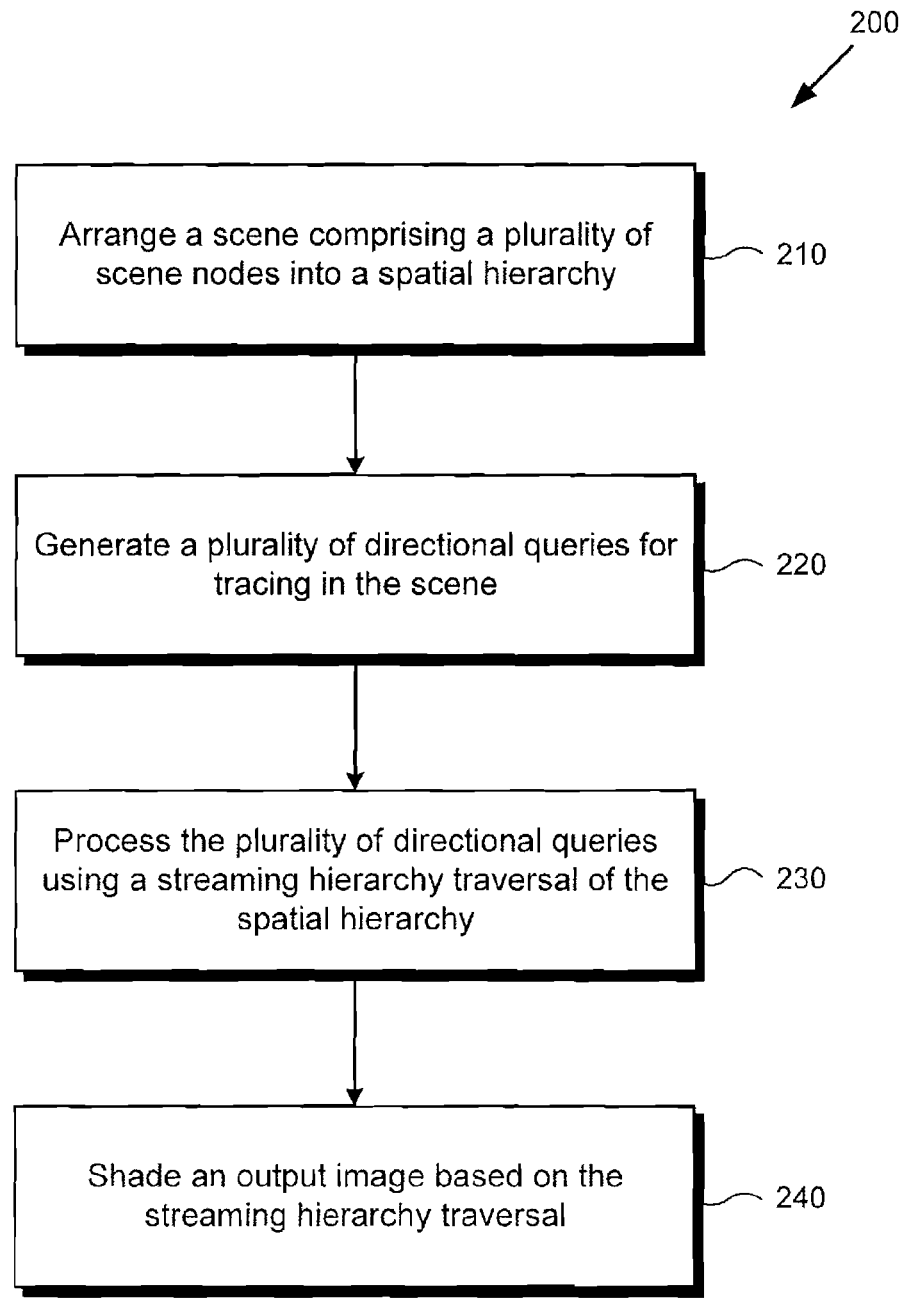
FIG. 2 presents an exemplary flowchart illustrating a method for providing a streaming hierarchy traversal renderer.

FIG. 2 presents an exemplary flowchart illustrating a method for providing a streaming hierarchy traversal renderer. Flowchart 200 begins when processor 112 of workstation 110 arranges a scene represented by scene data 150 into spatial hierarchy 126 (block 210). For example, object geometry 154 may be spatially divided into scene nodes, which are then organized into a tree-based bounding volume hierarchy (BVH) or another data structure. The tree may be organized as a binary, quad, or n-ary BVH, and may preferably be an n-ary BVH where n is at least three (3) for greater parallelism.

Next, processor 112 of workstation 110 generates camera rays 122 for tracing in a scene represented by scene data 150 (block 220). As previously discussed, the hierarchy traversal renderer may generate the camera rays 122 entirely within memory 114. For example, assuming a target render size of approximately 2 megapixels for high definition (1920 by 1080) video, and assuming a desired sampling of 100 samples per pixel to provide sufficient data for filtering, only 200 million camera ray records will be stored in memory 114. Assuming that each camera ray record occupies 100 bytes, approximately 20 gigabytes of memory is to be allocated, which is an amount easily accommodated by a modern server or even a high-end consumer class desktop computer. While radiance sampling camera rays 122 are utilized in the present example, processor 112 may also generate any desired directional query using any tracing shape, as previously described.

The directional queries or camera rays 122 may not necessarily correspond to a single point in time. For example, to provide a smoother visual perception for lower frame rates such as the standard theatrical rate of 24 frames per second, it is often desirable to provide motion blur by lengthening the virtual exposure time of a scene, rather than capturing the scene at a specific instant. Thus, in some implementations, camera rays 122 may vary over time.

After camera rays 122 or any other directional queries are generated according to the desired camera view of scene data 150, camera rays 122 may be organized and sorted, for example by origin point and direction vector, or grouped hierarchically by position and/or direction, thereby facilitating bounding box (or sphere or other shape) testing. Since a large number of records may need to be sorted, GPU 116 may be utilized for accelerated sorting. For example, the high performance RadixSorting algorithm can sort over 1G keys per second on a modern CUDA compatible GPU. See, "RadixSorting, High performance GPU radix sorting in CUDA", available from http://code.google.com/p/back40computing/wiki/RadixSorting.

Next, processor 112 of workstation 110 processes camera rays 122 using a streaming hierarchy traversal over spatial hierarchy 126 (block 230). More specifically, the streaming hierarchy traversal may perform a single pass over camera rays 122 for splitting into one child stream of camera rays for each child node of each of the scene nodes. Since the child streams provide each scene node in spatial hierarchy 126 with an associated set of camera rays rather than relying on a single copy of camera rays 122, processing of spatial hierarchy 126 can proceed in parallel and in any order. Thus, scene nodes of spatial hierarchy 126 may be divided and distributed for parallel processing across server 145a, 145b, 145c, and any other available resources.

Since the streaming hierarchy traversal can operate on different nodes independently and in parallel, the final results should be resolved by merging directional queries intersecting multiple scene nodes and removing results that are occluded by other nodes. These operations may be carried out by a stream-merge operation at each node of spatial hierarchy 126, or by using a shared data structure. Alternatively, a prior streaming hierarchy traversal pass may determine nearest hit points such that a subsequent shading process uses the nearest hit points to skip shading of occluded points entirely.

Additionally, if global illumination is to be provided, then the directional queries or camera rays 122 may be bounced as appropriate when intersected with scene geometry in spatial hierarchy 126. These bounced directional queries may be gathered and processed for an additional rendering pass, enabling multiple bounce passes for global illumination. Directional path information for light sources in the scene, or lighting 155, may also be utilized to improve rendering quality. The directional path information includes information about direct and indirect light source locations, and may be discovered from a previous streaming hierarchy traversal bounce pass or otherwise known in advance. By using the directional path information to concentrate sampling directions towards known light paths, sampling quality may be improved.

Next, processor 112 of workstation 110 shades output image 128 based on the streaming hierarchy traversal (block 240). For example, processor 112 may stream into memory 114 a plurality of geometry nodes, including geometry node 124, from object geometry 154 for hit testing with camera rays 122. As discussed above, since all computations are finished after freeing each node, each of the plurality of geometry nodes is accessed no more than once, and may be skipped entirely if not visible in the scene, for example behind the camera view. After reducing the possible candidates of camera rays 122 for intersection testing with geometry node 124, for example by bounding box testing, hit testing may proceed, and hit points may be recorded accordingly. If cones or other tracing shapes are used, then cone integration may be carried out instead of hit testing with individual rays.

Processor 112 may then shade output image 128 based on the hit testing or cone integration and optionally bounce camera rays 122 for further global illumination passes. Thus, at each recorded hit point, various properties may be evaluated to determine the shading of the hit, including the material properties of the object surface, lighting 155, textures 156, and shaders 157. If geometry needs to be procedurally generated, displaced, instantiated, or tessellated, such operations may be performed here prior to the hit testing and may also take advantage of the natural coherence benefits from geometry node 124.

If additional rays are to be spawned according to lighting 155 and/or the reflective or transmissive properties of the object surface, these additional rays may be "bounced" or queued for deferred processing by future global illumination passes. By deferring the bounces in this manner, data access for object geometry 154 may be kept highly coherent.

After the desired number of global illumination bounce passes are completed, then output image 128 may be filtered for outputting to a target display 118. As discussed above, 100 samples may be taken for each pixel. However, alternative embodiments may use different numbers of samples depending on the desired filtering quality. Thus, anti-alias filters may be applied to produce the final output image 128 in the target full HD resolution of 1920×1080. For animation, motion blur filters may also be applied depending on the movement of objects in the scene. Once output image 128 is completed, it may be stored in non-volatile storage as part of a larger render project, and may also be output to display 118 for observation and possible adjustment by user 130.

Figure 3:
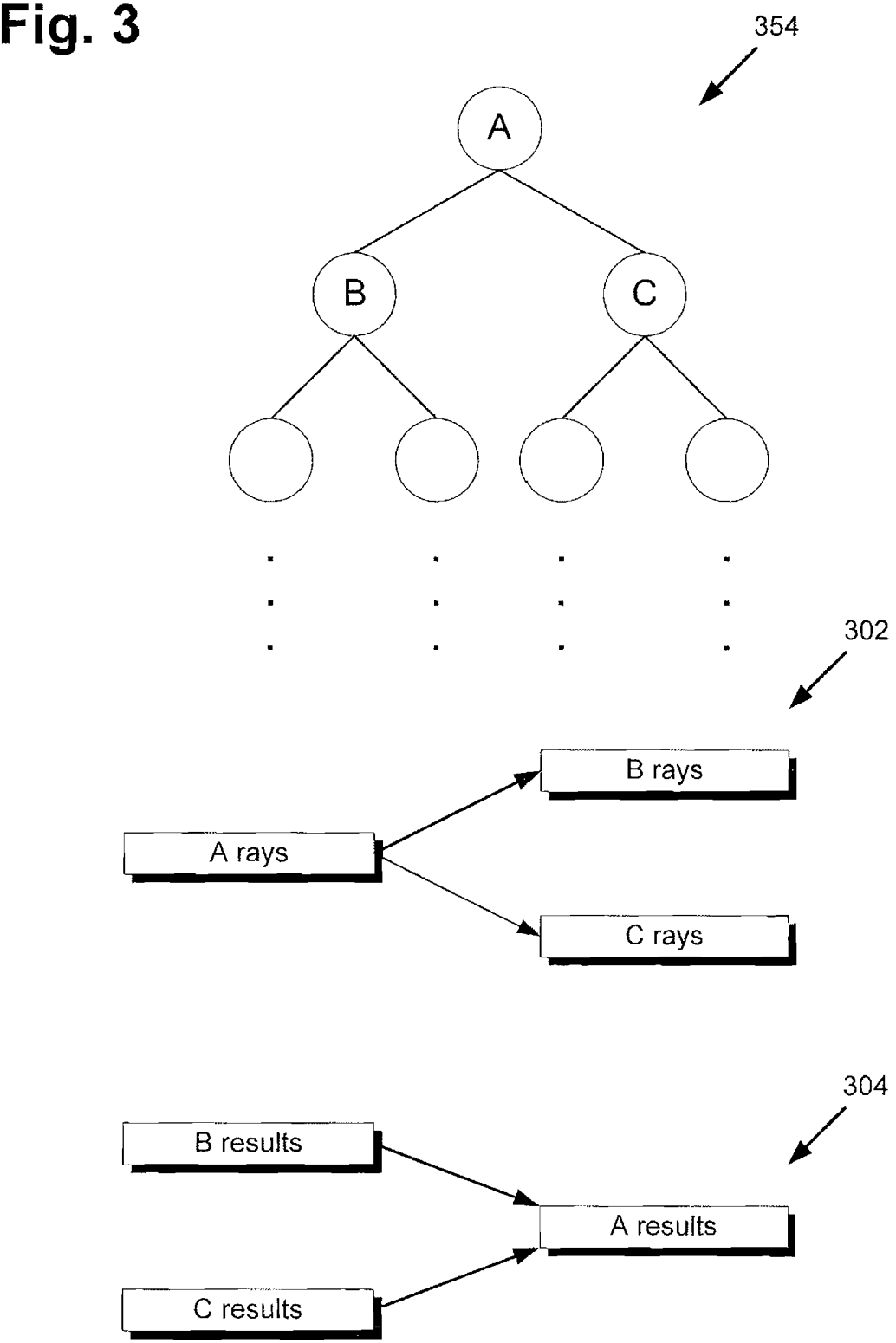
FIG. 3 presents an exemplary streaming hierarchy traversal for a streaming hierarchy traversal renderer.

FIG. 3 presents an exemplary streaming hierarchy traversal for a streaming hierarchy traversal renderer. Hierarchy 354 may correspond to spatial hierarchy 126 in FIG. 1, which organizes the plurality of nodes in object geometry 154 in a bounding volume hierarchy (BVH). Diagram 302 demonstrates the splitting of rays based on downward traversal of hierarchy 354. Diagram 304 demonstrates the merging of shading results based on upward traversal of hierarchy 354. As shown in FIG. 3, only small portions of hierarchy 354, diagram 302, and diagram 304 are shown for simplicity.

Hierarchy 354 may be generated as a binary BVH as shown in FIG. 3, but may also be generated as a quad BVH or preferably as an n-ary BVH where n is at least three (3), with each node representing a bounding volume around the corresponding geometry in object geometry 154, and leaf nodes corresponding to individual objects. Traversal begins at the top root node "A", and may proceed to be distributed in parallel downwards. As traversal proceeds downwards, the camera rays 122 may be split into one child stream for each child node as shown in diagram 302, with the A rays corresponding to all of the camera rays 122.

To determine the specific parallel or serial traversal of hierarchy 354, it may be useful to prioritize traversal by using various cost-metrics. Thus, the decision to split A rays into B rays and C rays in diagram 302 or the decision to not split further at all may be based on one or more factors including an average distance of a given node from a query origin, a number of queries for a given node, an estimated overlap of a given node with other nodes of the plurality of scene nodes, a relative importance of a given query or node, and a partial result earlier determined from the streaming hierarchy traversal. By integrating these cost-metrics, an optimized adaptive parallel-serial traversal can be provided, increasing parallelism while reducing redundant computations.

As shading results corresponding to output image 128 are completed, they are merged back up the hierarchy, and any redundant work is resolved, as shown in diagram 304. For example, if "B results" indicates a particular ray hits an object and B is closer to A than C in hierarchy 354, then the result for the same ray in C results, if any, may be overwritten, since the ray in C results would be occluded. If the ray is visible in both result sets, then the results may instead be merged.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the spirit and the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A computing device for providing a streaming hierarchy traversal renderer, the computing device comprising:
   a memory storing a rendering application; and
   a processor configured to execute the rendering application stored in the memory to:
      arrange a scene comprising a plurality of scene nodes into a spatial hierarchy;
      generate a plurality of directional queries for tracing in the scene;
      process the plurality of directional queries using a streaming hierarchy traversal of the spatial hierarchy, wherein the streaming hierarchy traversal performs a single pass over the plurality of directional queries for splitting into one child stream of directional queries for each child node of each of the plurality of scene nodes; and shade an output image based on the streaming hierarchy traversal.

2. The computing device of claim 1, wherein the plurality of directional queries are grouped hierarchically by position and/or direction.

3. The computing device of claim 1, wherein the spatial hierarchy is an n-ary hierarchy where n is at least three (3).

4. The computing device of claim 1, wherein the streaming hierarchy traversal uses a prioritized parallel traversal based on a cost-metric comprising at least one of: an average distance of a given node from a query origin, a number of queries for a given node, an estimated overlap of a given node with other nodes of the plurality of scene nodes, a relative importance of a given query or node, and a partial result earlier determined from the streaming hierarchy traversal.

5. The computing device of claim 1, wherein the processing of the plurality of directional queries further bounces the plurality of directional queries for multi-pass global illumination.

6. The computing device of claim 5, wherein the plurality of directional queries further includes directional path information for light sources in the scene, and wherein the bouncing uses the directional path information.

7. The computing device of claim 6, wherein the directional path information is discovered from a previous streaming hierarchy traversal bounce pass.

8. The computing device of claim 1, wherein the plurality of directional queries uses a tracing shape selected from the group consisting of camera rays, circular cones, elliptical cones, and polygonal cones.

9. The computing device of claim 1, wherein the plurality of directional queries sample values selected from the group consisting of radiance values and visibility values.

10. The computing device of claim 1, wherein the streaming hierarchy traversal records nearest hit points for the plurality of directional queries, and wherein the shading is done in a subsequent process using the nearest hit points to skip shading of occluded points.

11. The computing device of claim 1, wherein the plurality of directional queries vary over time.

12. The computing device of claim 1, wherein the plurality of directional queries are generated in the memory.

13. A method for use by a computing device having a processor and a memory storing a rendering application for providing a streaming hierarchy traversal renderer, the method comprising:

arranging, using the processor executing the rendering application from the memory, a scene comprising a plurality of scene nodes into a spatial hierarchy;

generating, using the processor executing the rendering application from the memory, a plurality of directional queries for tracing in the scene;

processing, using the processor executing the rendering application from the memory, the plurality of directional queries using a streaming hierarchy traversal of the spatial hierarchy, wherein the streaming hierarchy traversal performs a single pass over the plurality of directional queries for splitting into one child stream of directional queries for each child node of each of the plurality of scene nodes;

shading, using the processor executing the rendering application from the memory, an output image based on the streaming hierarchy traversal.

14. The method of claim 13, wherein the spatial hierarchy is an n-ary hierarchy where n is at least three (3).

15. The method of claim 13, wherein the streaming hierarchy traversal uses a prioritized parallel traversal based on a cost-metric comprising at least one of: an average distance of a given node from a query origin, a number of queries for a given node, an estimated overlap of a given node with other nodes of the plurality of scene nodes, a relative importance of a given query or node, and a partial result earlier determined from the streaming hierarchy traversal.

16. The method of claim 13, wherein the plurality of directional queries uses a tracing shape selected from the group consisting of camera rays, circular cones, elliptical cones, and polygonal cones.

17. A computing device for providing a streaming hierarchy traversal renderer, the computing device comprising:

a memory storing a rendering application; and a processor configured to execute the rendering application stored in the memory to:

arrange a scene comprising a plurality of scene nodes into a spatial hierarchy;

generate a plurality of directional queries for tracing in the scene;

process the plurality of directional queries using a streaming hierarchy traversal of the spatial hierarchy; and shade an output image based on the streaming hierarchy traversal.

18. The computing device of claim 17, wherein the streaming hierarchy traversal performs a single pass over the plurality of directional queries at each of the plurality of scene nodes.

19. The computing device of claim 17, wherein the streaming hierarchy traversal splits the plurality of directional queries over the spatial hierarchy by generating one child stream of directional queries for each child node of each of the plurality of scene nodes.

20. The computing device of claim 17, wherein the streaming hierarchy traversal uses a prioritized parallel traversal based on a cost-metric comprising at least one of: an average distance of a given node from a query origin, a number of queries for a given node, an estimated overlap of a given node with other nodes of the plurality of scene nodes, a relative importance of a given query or node, and a partial result earlier determined from the streaming hierarchy traversal.

* * * * *